United States Patent
Pandruvada

(10) Patent No.: US 8,107,999 B2
(45) Date of Patent: Jan. 31, 2012

(54) COMMUNICATION DEVICE AND METHOD OF COMMUNICATING TRANSMISSIONS

(75) Inventor: Srinivas Rao Pandruvada, Euless, TX (US)

(73) Assignee: Murata Manufacturing Co., Ltd., Kyoto (JP)

(*) Notice: Subject to any disclaimer, the term of this patent is extended or adjusted under 35 U.S.C. 154(b) by 359 days.

(21) Appl. No.: 12/555,358

(22) Filed: Sep. 8, 2009

(65) Prior Publication Data

US 2011/0059768 A1    Mar. 10, 2011

(51) Int. Cl.
*H04M 1/00*    (2006.01)

(52) U.S. Cl. ...... 455/552.1; 455/41.1; 455/78; 455/553; 370/339

(58) Field of Classification Search ............... 455/552.1, 455/78, 41.2, 553, 72, 83; 370/339
See application file for complete search history.

(56) References Cited

U.S. PATENT DOCUMENTS

| | | | |
|---|---|---|---|
| 7,818,029 B2* | 10/2010 | Sanguinetti | 455/552.1 |
| 7,873,019 B2* | 1/2011 | Dawson et al. | 370/338 |
| 7,933,561 B2* | 4/2011 | Sanguinetti | 455/78 |
| 2006/0194538 A1 | 8/2006 | Palin et al. | |
| 2008/0139118 A1* | 6/2008 | Sanguinetti | 455/41.2 |
| 2008/0253345 A1* | 10/2008 | Sanguinetti | 370/339 |
| 2008/0254745 A1* | 10/2008 | Zhang et al. | 455/41.2 |
| 2011/0194546 A1* | 8/2011 | Sanguinetti | 370/338 |

* cited by examiner

*Primary Examiner* — Minh D Dao
(74) *Attorney, Agent, or Firm* — Keating & Bennett, LLP

(57) ABSTRACT

A communication device including a first transceiver arranged to communicate transmissions based upon a first communications protocol, a second transceiver arranged to communicate transmissions based upon a second communications protocol that is different from the first communication protocol, an antenna connected to the first transceiver and to the second transceiver and arranged to communication transmissions for the first transceiver and the second transceiver, and a controller arranged to prioritize simultaneous communication of a transmission of the first transceiver and a transmission of the second transceiver based upon signal strength of transmissions of the first transceiver into either a higher prioritized transmission or a lower prioritized transmission and arranged to allow communication of the higher prioritized transmission.

16 Claims, 4 Drawing Sheets

COMMUNICATION DEVICE AND METHOD OF COMMUNICATING TRANSMISSIONS

BACKGROUND OF THE INVENTION

1. Field of the Invention

The present invention relates to optimizing the functionality of two distinct communication protocols that are implemented in the same system. More specifically, the present invention relates to optimizing the functionality of Bluetooth and Wi-Fi (Wireless Fidelity) signals in a coexistence scheme.

2. Description of the Related Art

Both Wi-Fi (IEEE 802.11) and Bluetooth (IEEE 802.15) operate in the 2.4 GHz ISM (Industrial Scientific Medical) unlicensed band. Wi-Fi is used to create a WLAN (wireless local area network), and Bluetooth is used to create a WPAN (wireless personal area network). Wi-Fi divides the 2.4 GHz ISM band into 20 MHz channels, and a station and an access point use one of the 20 MHz channels to send control and data messages. Bluetooth divides the whole 2.4 GHz ISM band into 74 adjacent 1 MHz channels and uses a hopping sequence between these 1 MHz channels to reduce interference and to increase privacy. However, when both Wi-Fi and Bluetooth are used, the hopping sequence of Bluetooth causes Wi-Fi and Bluetooth signals to interfere with each other.

This interference causes data loss in both the Wi-Fi and Bluetooth channels and can even lead to a terminated link. This situation is exacerbated in a device that simultaneously uses both Bluetooth and Wi-Fi. An example of such a situation is using a Bluetooth headset to make a VoIP (voice over internet protocol) voice call over a WLAN using Wi-Fi. This interference has a more profound effect on link SCO (Synchronous Connection Operation) or eSCO (extended Synchronous Connection Operation) with dedicated channel and stricter timing requirements due to voice latency issues than links that can tolerate delays like $A^2DP$ (Advanced Audio Distribution Profile).

To handle this interference, the IEEE recommends that the device with the Wi-Fi and Bluetooth transceivers includes a control block provided between the Wi-Fi and Bluetooth transceivers. This control block then selects which one of the Wi-Fi and Bluetooth transceivers is to operate at a particular time and assigns a higher priority to all Bluetooth transmissions. However, in a VoIP voice call over Wi-Fi, the connection between the callers can easily be terminated if all Bluetooth transmissions are chosen over simultaneous Wi-Fi transmissions, especially at low signal strength.

Another proposed solution to the interference problem is for Bluetooth to use AFH (Adaptive Frequency Hopping), which can be used to limit Bluetooth to only using those channels that will not interfere with the channels being used by Wi-Fi. However, AFH can only be used when Bluetooth and Wi-Fi are each using separate antennas and when there is sufficient isolation between the separate antennas. Accordingly, AFH cannot be used to solve Wi-Fi and Bluetooth interference problems in a system where a single antenna is being used for both Wi-Fi and Bluetooth.

An example of a system including Wi-Fi and Bluetooth coexistence is described in U.S. Patent Application Publication 2006/0194538. In the system described in this publication, a controller is provided between a Wi-Fi transceiver and a Bluetooth transceiver. When data is simultaneously received from both of the Wi-Fi transceiver and the Bluetooth transceiver, the controller prioritizes Wi-Fi transmissions and aborts Bluetooth transmissions unless the Bluetooth transmission is a re-transmission. That is, the controller will prioritize Wi-Fi transmissions over original Bluetooth transmissions (a first attempt at transmitting a Bluetooth packet), but will prioritize Bluetooth re-transmissions (second and subsequent attempts at transmitting a Bluetooth packet) over Wi-Fi transmissions. However, because this system assigns higher priority to Wi-Fi transmissions except for Bluetooth retransmissions, this system has a problem in low RSSI areas where Wi-Fi packet times are longer in that Bluetooth transmissions cannot be communicated in these areas. Further, this system has a problem in that it requires that eSCO be used because eSCO includes retransmission, while regular SCO does not.

Accordingly, there is an as of yet unmet need in the art for a system that can reduce interference between Wi-Fi and Bluetooth without unnecessarily reducing the transmitting speed of either Wi-Fi or Bluetooth.

SUMMARY OF THE INVENTION

To overcome the problems described above, preferred embodiments of the present invention provide.

According to a preferred embodiment of the present invention, a communication device including a first transceiver arranged to communicate transmissions based upon a first communications protocol, a second transceiver arranged to communicate transmissions based upon a second communications protocol that is different from the first communication protocol, an antenna connected to the first transceiver and to the second transceiver and arranged to communication transmissions for the first transceiver and the second transceiver; and a controller arranged to prioritize simultaneous communication of a transmission of the first transceiver and a transmission of the second transceiver based upon signal strength of transmissions of the first transceiver into either a higher prioritized transmission or a lower prioritized transmission and arranged to allow communication of the higher prioritized transmission.

Preferably, if the signal strength of transmissions of the first transceiver is above a threshold, then the controller prioritizes the transmission of the second transceiver as the higher prioritized transmission, and if the signal strength of transmissions of the first transceiver is below the threshold, then the controller prioritizes the transmission of the first transceiver as the higher prioritized transmission.

Preferably, the transmissions of the first transceiver include a first group of transmissions and a second group of transmissions different from the first group of transmissions. If the signal strength of transmissions of the first transceiver is above a threshold, then the controller prioritizes the transmission of the second transceiver as the higher prioritized transmission and prioritizes the transmission of the first transceiver as the lower prioritized transmission; if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission; and if the signal strength of transmissions of the first transceiver is below the threshold and if the transmission of the first transceiver is one of the second group of transmissions, then the controller prioritizes the transmission of the second transceiver as the higher prioritized transmission and prioritizes the transmission of the first transceiver as the lower prioritized transmission.

Preferably, the transmissions of the first transceiver includes a first group of transmissions and a second group of transmissions different from the first group of transmissions, and the transmissions of the second transceiver includes a third group of transmissions and a fourth group of transmissions different from the third group of transmissions. If the signal strength of transmissions of the first transceiver is above a threshold and if the transmission of the second transceiver is one of the third group of transmissions, then the controller prioritizes the transmission of the second transceiver as the higher prioritized transmission and prioritizes the transmission of the first transceiver as the lower prioritized transmission; if the signal strength of transmissions of the first transceiver is above a threshold and if the transmission of the second transceiver is one of the fourth group of transmissions, then the controller prioritizes the transmission of the first transceiver as the higher prioritized transmission and prioritizes the transmission of the first transceiver as the lower prioritized transmission; if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission; and if the signal strength of transmissions of the first transceiver is below the threshold and if the transmission of the first transceiver is one of the second group of transmissions, then the controller prioritizes the transmission of the second transceiver as the higher prioritized transmission and prioritizes the transmission of the first transceiver as the lower prioritized transmission.

Preferably, the transmissions of the first transceiver includes a first group of transmissions and a second group of transmissions different from the first group of transmissions, and the transmissions of the second transceiver includes a third group of transmissions and a fourth group of transmissions different from the third group of transmissions. If the signal strength of transmissions of the first transceiver is above a threshold and if the transmission of the second transceiver is one of the third group of transmissions, then the controller prioritizes the transmission of the second transceiver as the higher prioritized transmission and prioritizes the transmission of the first transceiver as the lower prioritized transmission; if the signal strength of transmissions of the first transceiver is above a threshold and if the transmission of the second transceiver is one of the fourth group of transmissions, then the controller prioritizes the transmission of the first transceiver as the higher prioritized transmission and prioritizes the transmissions of the second transceiver as the lower prioritized transmission; if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission; if the signal strength of transmissions of the first transceiver is below the threshold, if the transmission of the first transceiver is one of the second group of transmissions, and if the transmission of the second transceiver is one of the third group of transmissions, then the controller prioritizes the transmission of the second transceiver as the higher prioritized transmission and prioritizes the transmission of the first transceiver as the lower prioritized transmission; and if the signal strength of transmissions of the first transceiver is below the threshold, if the transmission of the first transceiver is one of the second group of transmissions, and if the transmission of the second transceiver is one of the fourth group of transmissions, then the controller prioritizes the transmission of the first transceiver as the higher prioritized transmission and prioritizes the transmission of the second transceiver as the lower prioritized transmission.

In this preferred embodiment, the first communications protocol is preferably Wi-Fi, and the second communications protocol is preferably Bluetooth. Preferably, the first group of transmissions of the first transceiver includes one of an RTS frame, an CTS frame, an ACK frame, Block Ack frame, an ATIM frame, or a cf-ACK frame. After the higher prioritized transmission in communicated, the lower prioritized transmission is preferably communicated.

According to a preferred embodiment of the present invention, a method of communicating transmissions includes providing transmissions based upon a first communications protocol, providing transmissions based upon a second communications protocol that is different from the first communication protocol, communicating through an antenna the transmissions based upon the first communications protocol and the transmissions based upon the second communications protocol, and when a transmission based upon the first communications protocol and a transmission based upon the second communications protocol are simultaneously provided, prioritizing the transmission based upon the first communications protocol and the transmission based upon the second communications protocol based upon signal strength of transmissions of the first communications protocol into either a higher prioritized transmission or a lower prioritized transmission. During the step of communicating, the higher prioritized transmission is communicated.

Preferably, if the signal strength of transmissions of the first communications protocol is above a threshold, then the transmission of the second communications protocol is prioritized as the higher prioritized transmission; and if the signal strength of transmissions of the first communications protocol is below the threshold, then the transmission of the first communications protocol is prioritized as the higher prioritized transmission.

Preferably, the transmissions of the first communications protocol includes a first group of transmissions and a second group of transmissions different from the first group of transmissions. If the signal strength of transmissions of the first communications protocol is above a threshold, then the transmission of the second communications protocol is prioritized the higher prioritized transmission and transmission of the first communications protocol is prioritized as the lower prioritized transmission; if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission; and if the signal strength of transmissions of the first communications protocol is below the threshold and if the transmission of the first communications protocol is one of the second group of transmissions, then the transmission of the second communications protocol is prioritized as the higher prioritized transmission and the transmission of the first communications protocol is prioritized as the lower prioritized transmission.

Preferably, the transmissions of the first communications protocol includes a first group of transmissions and a second group of transmissions different from the first group of transmissions, and the transmissions of the second communications protocol includes a third group of transmissions and a fourth group of transmissions different from the third group of transmissions. If the signal strength of transmissions of the first communications protocol is above a threshold and if the transmission of the second communications protocol is one of the third group of transmissions, then the transmission of the second communications protocol is prioritized as the higher prioritized transmission and the transmission of the first communications protocol is prioritized as the lower prioritized transmission; if the signal strength of transmissions of the first communications protocol is above a threshold and if the transmission of the second communications protocol is one of the fourth group of transmissions, then the transmission of the first communications protocol is prioritized as the higher prioritized transmission and the transmission of the first communications protocol is prioritized as the lower prioritized transmission; if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission; and if the signal strength of transmissions of the first communications protocol is below the threshold and if the transmission of the first communications protocol is one of the second group of transmissions, then the transmission of the second communications protocol is prioritized as the higher prioritized transmission and the transmission of the first communications protocol is prioritized as the lower prioritized transmission.

Preferably, the transmissions of the first communications protocol includes a first group of transmissions and a second group of transmissions different from the first group of transmissions, and the transmissions of the second communications protocol includes a third group of transmissions and a fourth group of transmissions different from the third group of transmissions. if the signal strength of transmissions of the first communications protocol is above a threshold and if the transmission of the second communications protocol is one of the third group of transmissions, then the transmission of the second communications protocol is prioritized as the higher prioritized transmission and the transmission of the first communications protocol is prioritized as the lower prioritized transmission; if the signal strength of transmissions of the first communications protocol is above a threshold and if the transmission of the second communications protocol is one of the fourth group of transmissions, then the transmission of the first communications protocol is prioritized as the higher prioritized transmission and the transmissions of the second communications protocol is prioritized as the lower prioritized transmission; if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission; if the signal strength of transmissions of the first communications protocol is below the threshold, if the transmission of the first communications protocol is one of the second group of transmissions, and if the transmission of the second communications protocol is one of the third group of transmissions, then the transmission of the second communications protocol is prioritized as the higher prioritized transmission and the transmission of the first communications protocol is prioritized as the lower prioritized transmission; and if the signal strength of transmissions of the first communications protocol is below the threshold, if the transmission of the first communications protocol is one of the second group of transmissions, and if the transmission of the second communications protocol is one of the fourth group of transmissions, then the transmission of the first communications protocol is prioritized as the higher prioritized transmission and the transmission of the second communications protocol is prioritized as the lower prioritized transmission.

In this preferred embodiment, the first communications protocol is preferably Wi-Fi, and the second communications protocol is preferably Bluetooth. Preferably, the first group of transmissions of the first communications protocol includes one of an RTS frame, an CTS frame, an ACK frame, Block Ack frame, an ATIM frame, or a cf-ACK frame. After the higher prioritized transmission in communicated, the lower prioritized transmission is preferably communicated.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The preferred embodiments of the present invention are discussed below with respect to FIGS. 1-4. First, a description of a device that is used in preferred embodiments of the present invention will be described. Second, an operation of a control scheme used in operating the device will be discussed.

Figure 1:
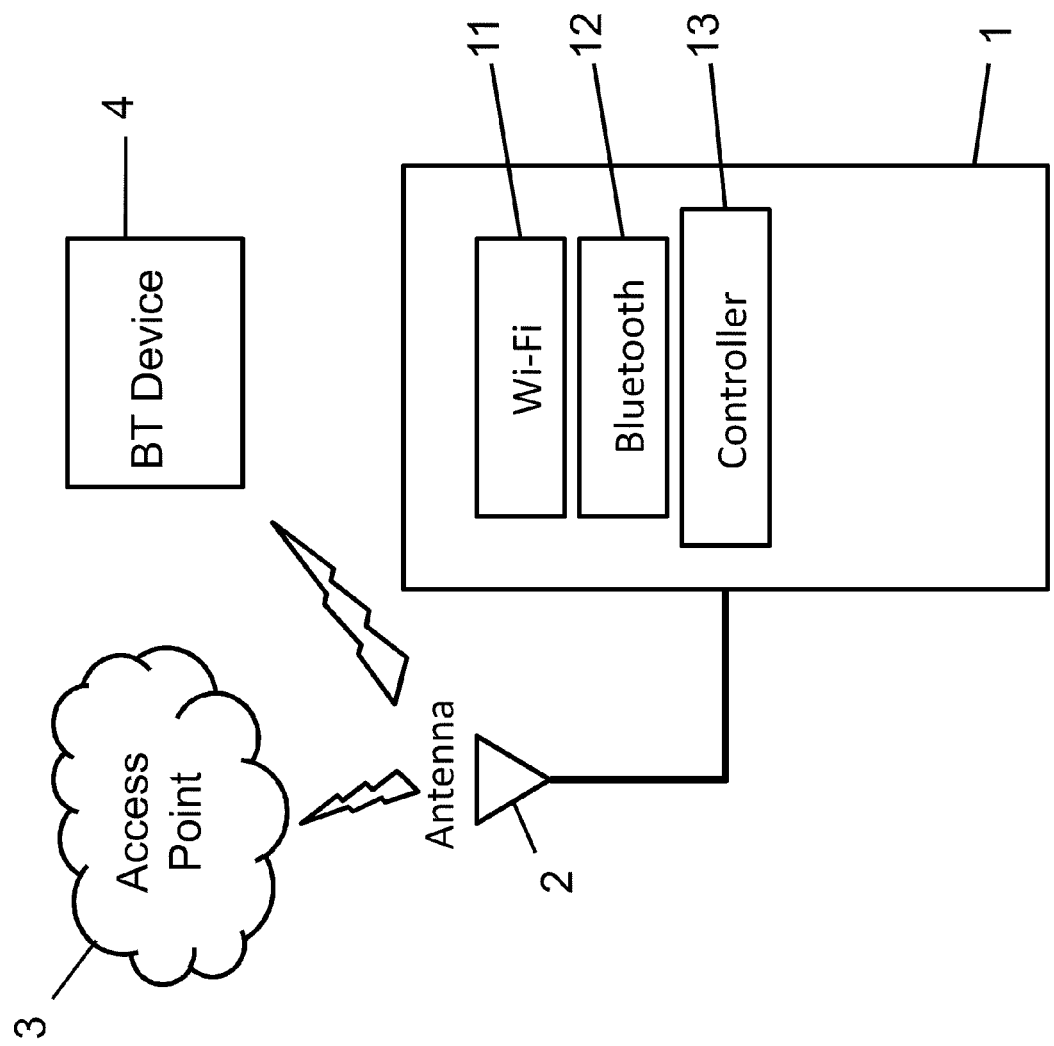
FIG. 1 a block diagram of a device according to a preferred embodiment of the present invention.

FIG. 1 shows a device 1 that can be used in accordance with preferred embodiments of the present invention. The device 1 could be any manner of apparatus that uses a plurality of communication protocols to transfer data. For example, the device 1 could be a telephone, computer, television, video player, audio player, or any other suitable device. As shown in FIG. 1, the device 1 includes a single antenna 2 through which transmissions in accordance with the plurality of communication protocols are sent and received. In the preferred embodiments, the communication protocols preferably are Wi-Fi and Bluetooth; however, it should be noted that any other desired communication protocols that operates in similar frequency ranges could be used with the preferred embodiments of the present invention.

As shown in FIG. 1, the device 1 preferably includes a Wi-Fi transceiver 11, a Bluetooth transceiver 12, and a controller 13. The Wi-Fi transceiver 11 controls the transmission and reception of Wi-Fi signals between the device 1 and an access point 3 through the antenna 2. The Wi-Fi transceiver 11 and the access point 3 define a WLAN. The Bluetooth transceiver 12 controls the transmission and reception of Bluetooth communication between the device 1 and a Bluetooth device 4. The Bluetooth transceiver 12 and the Bluetooth device 4 define a WPAN. The controller 13 coordinates the transmission and reception of Wi-Fi and Bluetooth signals such that the Wi-Fi and Bluetooth signals can both be propagated through the antenna 2 in coexistence.

Wi-Fi and Bluetooth both use the same frequency band, and there are times when Wi-Fi transmissions and Bluetooth transmissions are both ready to be sent through the antenna at the same time. Accordingly, it is necessary to determine which one of the Wi-Fi transmissions and Bluetooth transmissions should be given priority at a specific time. This becomes an even bigger problem when the signal strength between the access point 3 and the device 1 is low.

Figure 2:
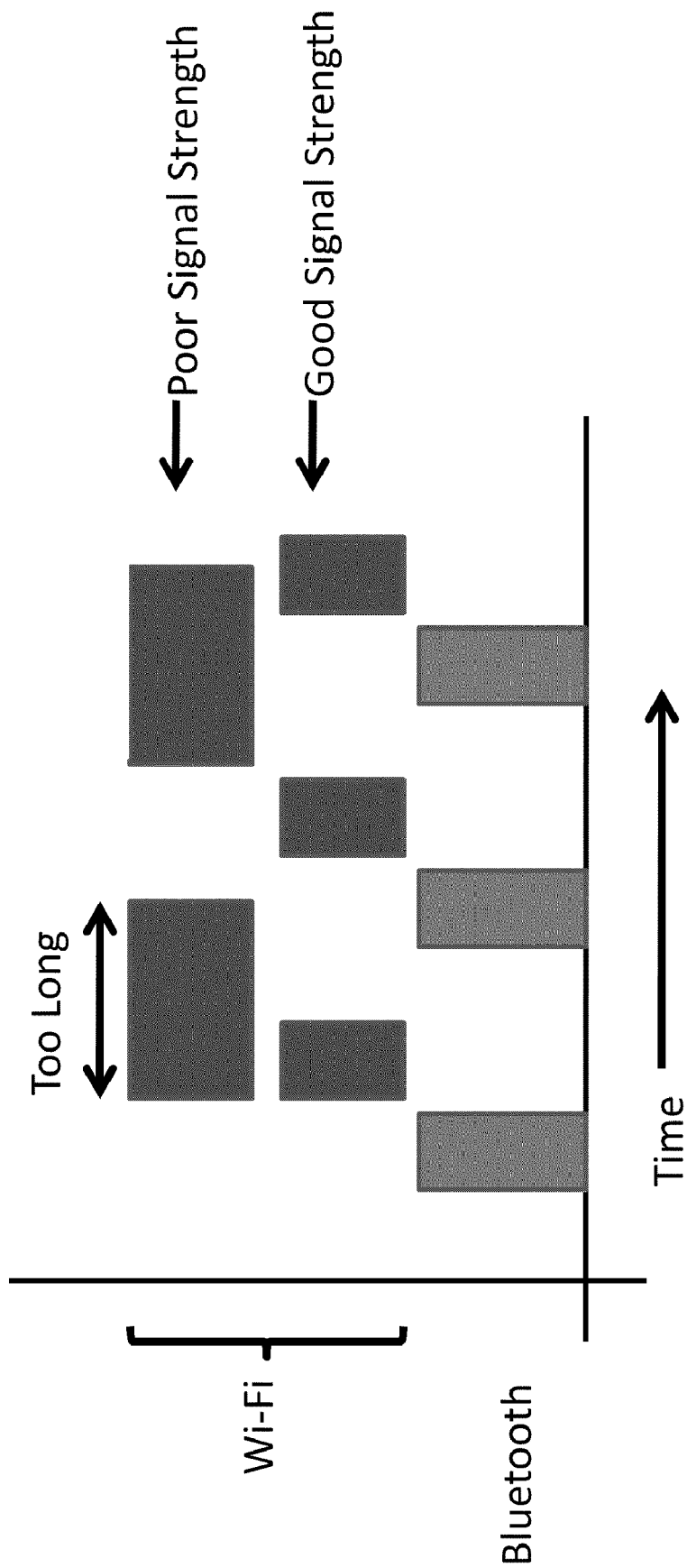
FIG. 2 is a chart that illustrates conditions under which a preferred embodiment of the present invention functions.

When the signal strength is good and the environment is relatively free of any signal noise, the access point 3 uses high rate frames in the range of, for example, about 24 Mbps to about 54 Mbps for transmission. In this range of high rate frames, packet times, which is the time to transmit/receive one packet, can range from, for example, about 0.394 ms to about 0.694 ms, which results in a MTU (Maximum Transmission Unit) of about 1536 bytes. As shown in FIG. 2, at such a rate, it is very likely that a successful TCP (Transmission Control Protocol) transaction will be completed in the about 2.5 ms period of idle time between two consecutive SCO slots of Bluetooth transmissions. A system using eSCO would have an even longer idle time of about 6.5 ms.

However, as shown in FIG. 2, when the signal strength between the access point 3 and the device 1 is low, the reduction in the frame rate may result in the length of time it takes to transmit the data packet to exceed the length of time between consecutive SCO or eSCO slots of the Bluetooth transmission. Accordingly, if the device continues to prioritize Bluetooth transmissions over Wi-Fi transmissions in every slot required for SCO or eSCO, then the Wi-Fi link will become disconnected.

FIG. 2 shows a chart that illustrates these differences in the relationship between the Wi-Fi transmissions and the Bluetooth transmissions when the signal strength between the access point 3 and the device 1 is strong and when the signal strength between the access point 3 and the device 1 is weak. As shown in FIG. 2, when the signal strength between the access point 3 and the device 1 is strong, the Wi-Fi transmissions are able to fit in the space between consecutive SCO or eSCO slots of the Bluetooth transmissions. However, when the signal strength between the access point 3 and the device 1 is weak, the Wi-Fi transmissions last longer so that the Wi-Fi transmissions begin to overlap with the Bluetooth transmissions, becoming longer than the space between consecutive SCO or eSCO slots of the Bluetooth transmissions, as shown in the top of FIG. 2. If the Bluetooth transmissions are prioritized over the Wi-Fi transmissions, then this overlapping between the Wi-Fi transmission and the Bluetooth transmission will lead to dropped Wi-Fi data packets, which will eventually result in the Wi-Fi link between the access point 3 and the device 1 being terminated.

A preferred embodiment of the present invention prioritizes Wi-Fi transmissions and Bluetooth transmissions depending on the specific circumstances. In this preferred embodiment, when the device 1 is connected to the access point 3, the strength of the connection between the access point 3 and the device in monitored. The signal strength will be determined based on RSSI (Received Signal Strength Indication), but it is noted that signal strength could be determined through any other desirable parameter such as, for example, RX-Quality (a value assigned by a network indicating the quality of the received signal based on the bit error rate), bit error rate, SNR (Signal to Noise Ratio), etc. It should also be noted that, because of RSSI signal fluctuations even when the device 1 is stationary, it is preferable that the signal strength should be determined with respect to a moving average, rather than just a single instantaneous signal strength value. It may also be necessary to consider a time factor to reduce any ping-pong effect, which is caused by making a decision based upon a single reading. A time average of the RSSI signal smoothes out the variations in the RSSI signals.

For example, when the RSSI indicates that the signal strength is good (e.g., 24 Mbps<RSSI<54 Mbps), Bluetooth transmissions are given a higher priority than Wi-Fi transmissions. Because the frame rate is so high, the Wi-Fi link will not be dropped because there is plenty of time for the Wi-Fi transmission to fit between the Bluetooth transmissions.

However, when the RSSI indicates that the signal strength is poor (e.g., RSSI<24 Mbps), certain Wi-Fi data packets will be given higher priority than Bluetooth transmissions. These prioritized Wi-Fi data packets are predetermined to be packets that contain specific frames. These desired frames could include, for example, RTS (Request To Send), CTS (Clear To Send), ACK (Acknowledgement), Block Ack (Block Acknowledgement), ATIM (Announcement Traffic Indication Message), CF-ACK (Contention Free Acknowledgement), or any other desirable packet type.

Figure 3:
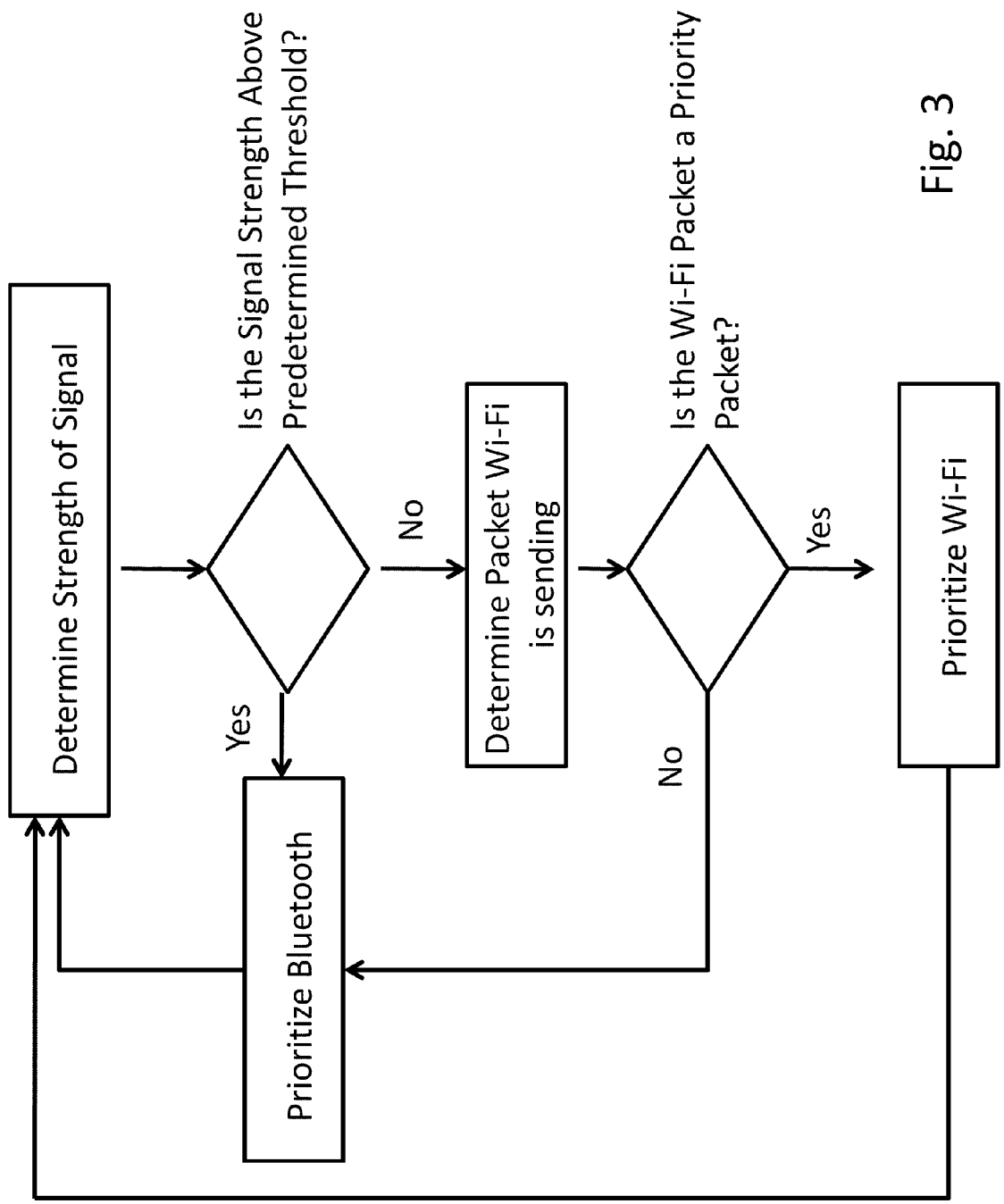
FIG. 3 is a flow diagram showing a process for prioritizing specific data types.

Accordingly, by prioritizing specific Wi-Fi data packets over all Bluetooth transmissions, it is possible to maintain TCP/IP (Transmission Control Protocol/Internet Protocol) connectivity between the device 1 and the access point 3. FIG. 3 shows a flow diagram which illustrates the prioritizing process. First, the signal strength for a specific time is determined. Then, if the signal strength is above a specific predetermined threshold (i.e., the signal is good), then Bluetooth transmissions are prioritized over Wi-Fi transmissions. Then after sending the Bluetooth transmission and the Wi-Fi transmissions between the Bluetooth transmissions, the process returns to the signal strength determination step. However, if the signal strength is determined to be below a specific predetermined threshold (i.e., the signal is bad), then only the specific Wi-Fi transmissions are prioritized over Bluetooth transmissions, otherwise Bluetooth transmissions are prioritized over Wi-Fi transmissions. That is, if the Wi-Fi transmission is a priority data packet, then the Wi-Fi data packet will be transmitted instead of the Bluetooth transmission, but if the Wi-Fi packet is not a priority data packet, then the Bluetooth transmission will be prioritized over the Wi-Fi data packet. Then, after sending the Bluetooth transmission, the process with return to the signal strength determination step.

Another preferred embodiment of the present invention uses a more nuanced priority scheme under low signal strength conditions. According to this other preferred embodiment, there are high and low priority Wi-Fi packets and high and low priority Bluetooth packets. The high priority Bluetooth packets are predetermined to be packets that contain specific frames, especially frames that establish sessions. These frames could include, for example, Broadcast, Connection, SCO, eSCO, master-slave switch, or any other desirable packet type. Under high signal strength conditions, the order of priority is: 1) high priority Bluetooth packets, 2) all Wi-Fi packets, and 3) low priority Bluetooth packets, and under low signal strength conditions, the order of priority is: 1) high priority Wi-Fi packets, 2) high priority Bluetooth packets, 3) low priority Wi-Fi packets, and 4) low priority Bluetooth packets. By using this priority scheme, both the Bluetooth and the Wi-Fi links are maintained, even in the low signal environment.

Another example of a more nuanced priority scheme according to this preferred embodiment includes a slightly different order of priority. Under high signal strength conditions, the order of priority is: 1) high priority Bluetooth packets, 2) all Wi-Fi packets, and 3) low priority Bluetooth packets, and under low signal strength, the order of priority will be: 1) high priority Wi-Fi packets, 2) high priority Bluetooth packets, 3) low priority Bluetooth packets, and 4) low priority Wi-Fi packets. By using this priority scheme, both the Bluetooth and the Wi-Fi links are maintained, even in the low signal environment, and because Bluetooth low priority packets will get more priority, slightly better voice quality on Bluetooth can be achieved.

According to the preferred embodiments, termination of the TCP/IP link can be avoided when a signal strength between the device 1 and the access point 3 is low because the priority Wi-Fi packets contain the frames that are necessary to maintain the TCP/IP link between the device 1 and the access point 3. It is also possible to set a limit to the number of SCO and eSCO frames that can be skipped to maintain a Wi-Fi connection. While these schemes may result in some degradation of the Bluetooth signal (i.e., a reduction in voice quality in a Bluetooth headset), this degradation may be tolerable by optimizing the configuration of the device 1.

Figure 4:
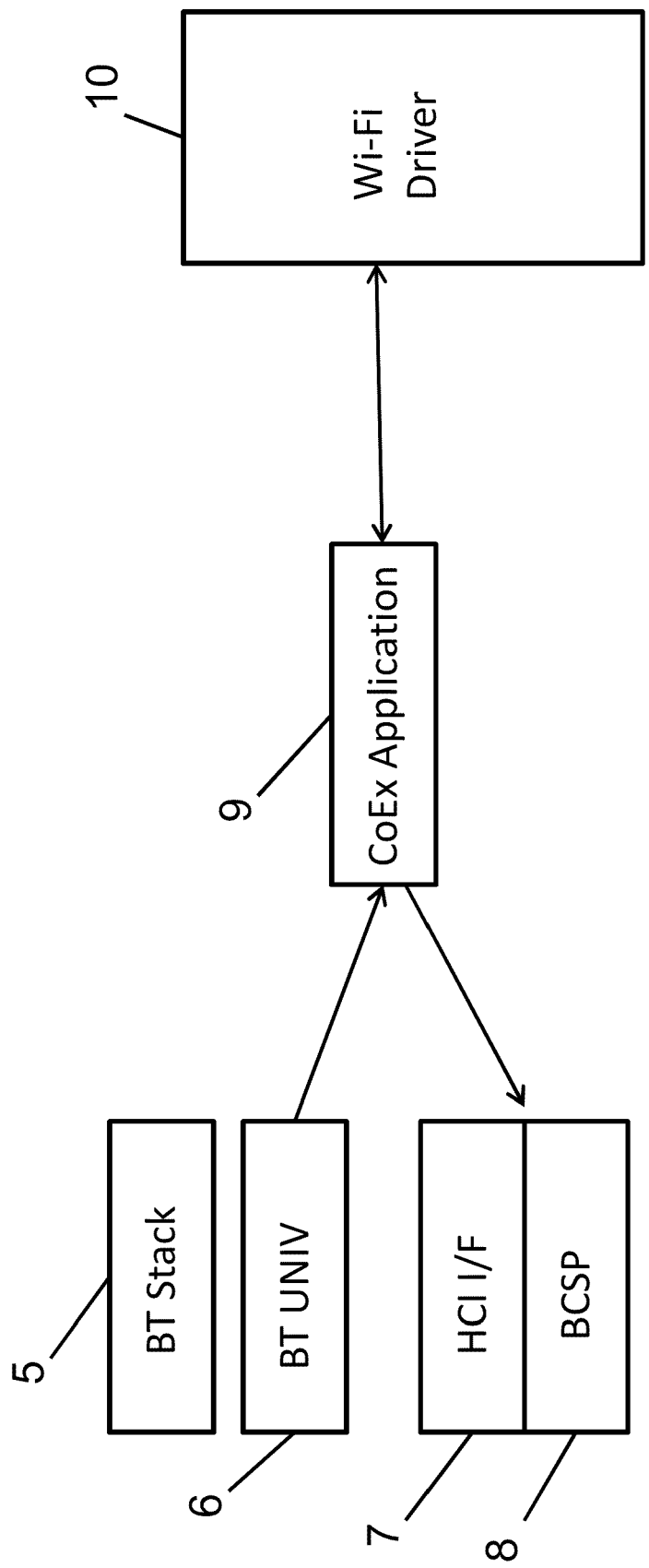
FIG. 4 is a block diagram of an architecture that could be used in accordance with a preferred embodiment of the present invention.

FIG. 4 shows an example of the architecture that could be included in device 1 in accordance with a preferred embodiment of the present invention. The architecture preferably includes a Bluetooth stack 5, a Bluetooth universal transmitter 6 ("BT Univ" is Microsoft's interface to the HCI layer to keep the upper layer of the software interface the same for all BT chipsets), a HCI I/F (Host Controlled Interface) 7 connected to BCSP (Blue Core Serial Protocol) 8 (BCSP communicates HCI frames and is a protocol to reliably transfer HCI packets from a host to the BT chipset.), a coexistence application 9, and a Wi-Fi driver 10. This architecture is preferably arranged to be capable of dynamically setting BCA registers, which are a set of register defined by Marvell to control BT/WiFi transmissions, altering settings based on the type of Bluetooth link, returning to a default value to return to after termination of a link, permitting customers or customers platforms to tune the operations of the scheme.

In this architecture, the coexistence application 9 is arranged to determine if a Wi-Fi transmission or a Bluetooth transmission will be performed at a specific time in accordance with the above schemes. The coexistence application 9 performs these operations by receiving an indication of the channel to which the Wi-Fi is connected through the Wi-Fi driver 10, determining the start and stop times of the SCO or eSCO link through the Bluetooth universal transmitter 6, checking the signal strength of the channel to which the Wi-Fi is connected when both a Wi-Fi transmission and Bluetooth transmission are simultaneously active. The coexistence application 9 is also arranged to send the BCA configuration by using the OID (Object Identifier) of the device 1. The priority based on RSSI can be dynamically changed without user intervention. This application monitors RSSI and sets correct values for the BCA registers. In addition this application reads Wi-Fi channel and uses HCI to send BT chipset a command to avoid certain RF frequencies (AFH).

However, it should be noted that the architecture of FIG. 4 is merely provided as an example of a suitable architecture for use with the preferred embodiments of the present invention and that it would be possible to replace this architecture with any other suitable architecture.

Preferred embodiments of the present invention can be used in single-antenna systems with Wi-Fi and Bluetooth chipsets. Typically, either 3-wire or 4-wire protocols are established between the Wi-Fi and Bluetooth chipsets. It is also possible to use other protocols. The 3-wire or 4-wire protocols, or other protocols, help to control both the Wi-Fi and Bluetooth subsystems in a collaborative way, "coexistence." Many chipsets including 3-wire or 4-wire protocols allow for the configuration thereof to control how the single antenna will operate for the Bluetooth and Wi-Fi subsystems.

With the preferred embodiments of the present invention, it is possible to reduce degradation caused by interference by using the 3-wire or 4-wire protocols.

The above preferred embodiments of the present invention describe schemes which permit the coexistence of Wi-Fi and Bluetooth transmissions, but it should be noted that the present invention is not limited to only Wi-Fi and Bluetooth and could be adapted to facilitate the transmission of any plurality of communication protocols in a network. That is, the present invention is not limited to merely two coexisting protocols or limited to Wi-Fi and Bluetooth protocols.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A communication device comprising:
   a first transceiver arranged to communicate transmissions based upon a first communications protocol;
   a second transceiver arranged to communicate transmissions based upon a second communications protocol that is different from the first communication protocol;
   an antenna connected to the first transceiver and to the second transceiver and arranged to communication transmissions for the first transceiver and the second transceiver; and
   a controller arranged to:
      prioritize simultaneous communication of a transmission of the first transceiver and a transmission of the second transceiver based upon signal strength of transmissions of the first transceiver into either a higher prioritized transmission or a lower prioritized transmission; and
      allow communication of the higher prioritized transmission.

2. The communication device according to claim 1, wherein:
   if the signal strength of transmissions of the first transceiver is above a threshold, then the controller prioritizes the transmission of the second transceiver as the higher prioritized transmission; and
   if the signal strength of transmissions of the first transceiver is below the threshold, then the controller prioritizes the transmission of the first transceiver as the higher prioritized transmission.

3. The communication device according to claim 1, wherein:
   the transmissions of the first transceiver include a first group of transmissions and a second group of transmissions different from the first group of transmissions;
   if the signal strength of transmissions of the first transceiver is above a threshold, then the controller prioritizes the transmission of the second transceiver as the higher prioritized transmission and prioritizes the transmission of the first transceiver as the lower prioritized transmission;
   if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission; and if the signal strength of transmissions of the first transceiver is below the threshold and if the transmission of the first transceiver is one of the second group of transmissions, then the controller prioritizes the transmission of the second transceiver as the higher prioritized transmission and prioritizes the transmission of the first transceiver as the lower prioritized transmission.

4. The communication device according to claim 3, wherein:
the first communications protocol is Wi-Fi;
the second communications protocol is Bluetooth; and
the first group of transmissions of the first transceiver includes one of an RTS frame, an CTS frame, an ACK frame, Block Ack frame, an ATIM frame, or a cf-ACK frame.

5. The communication device according to claim 1, wherein:
the transmissions of the first transceiver includes a first group of transmissions and a second group of transmissions different from the first group of transmissions;
the transmissions of the second transceiver includes a third group of transmissions and a fourth group of transmissions different from the third group of transmissions;
if the signal strength of transmissions of the first transceiver is above a threshold and if the transmission of the second transceiver is one of the third group of transmissions, then the controller prioritizes the transmission of the second transceiver as the higher prioritized transmission and prioritizes the transmission of the first transceiver as the lower prioritized transmission;
if the signal strength of transmissions of the first transceiver is above a threshold and if the transmission of the second transceiver is one of the fourth group of transmissions, then the controller prioritizes the transmission of the first transceiver as the higher prioritized transmission and prioritizes the transmission of the first transceiver as the lower prioritized transmission;
if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission; and
if the signal strength of transmissions of the first transceiver is below the threshold and if the transmission of the first transceiver is one of the second group of transmissions, then the controller prioritizes the transmission of the second transceiver as the higher prioritized transmission and prioritizes the transmission of the first transceiver as the lower prioritized transmission.

6. The communication device according to claim 1, wherein:
the transmissions of the first transceiver includes a first group of transmissions and a second group of transmissions different from the first group of transmissions;
the transmissions of the second transceiver includes a third group of transmissions and a fourth group of transmissions different from the third group of transmissions;
if the signal strength of transmissions of the first transceiver is above a threshold and if the transmission of the second transceiver is one of the third group of transmissions, then the controller prioritizes the transmission of the second transceiver as the higher prioritized transmission and prioritizes the transmission of the first transceiver as the lower prioritized transmission;
if the signal strength of transmissions of the first transceiver is above a threshold and if the transmission of the second transceiver is one of the fourth group of transmissions, then the controller prioritizes the transmission of the first transceiver as the higher prioritized transmission and prioritizes the transmissions of the second transceiver as the lower prioritized transmission;
if the signal strength of transmissions of the first transceiver is below the threshold and if the transmission of the first transceiver is one of the first group of transmissions, then the controller prioritizes the transmission of the first transceiver as the higher prioritized transmission and prioritizes the transmission of the second transceiver as the lower prioritized transmission;
if the signal strength of transmissions of the first transceiver is below the threshold, if the transmission of the first transceiver is one of the second group of transmissions, and if the transmission of the second transceiver is one of the third group of transmissions, then the controller prioritizes the transmission of the second transceiver as the higher prioritized transmission and prioritizes the transmission of the first transceiver as the lower prioritized transmission; and
if the signal strength of transmissions of the first transceiver is below the threshold, if the transmission of the first transceiver is one of the second group of transmissions, and if the transmission of the second transceiver is one of the fourth group of transmissions, then the controller prioritizes the transmission of the first transceiver as the higher prioritized transmission and prioritizes the transmission of the second transceiver as the lower prioritized transmission.

7. The communication device according to claim 1, wherein:
the first communications protocol is Wi-Fi; and
the second communications protocol is Bluetooth.

8. The communication device according to claim 1, wherein after the higher prioritized transmission in communicated, the lower prioritized transmission is communicated.

9. A method of communicating transmissions comprising:
providing transmissions based upon a first communications protocol;
providing transmissions based upon a second communications protocol that is different from the first communication protocol;
communicating through an antenna the transmissions based upon the first communications protocol and the transmissions based upon the second communications protocol; and
when a transmission based upon the first communications protocol and a transmission based upon the second communications protocol are simultaneously provided, prioritizing the transmission based upon the first communications protocol and the transmission based upon the second communications protocol based upon signal strength of transmissions of the first communications protocol into either a higher prioritized transmission or a lower prioritized transmission; wherein
during the step of communicating, the higher prioritized transmission is communicated.

10. The method of communicating transmissions according to claim 9, wherein:
if the signal strength of transmissions of the first communications protocol is above a threshold, then the transmission of the second communications protocol is prioritized as the higher prioritized transmission; and if the signal strength of transmissions of the first communications protocol is below the threshold, then the transmission of the first communications protocol is prioritized as the higher prioritized transmission.

11. The method of communicating transmissions according to claim 9, wherein:
   the transmissions of the first communications protocol include a first group of transmissions and a second group of transmissions different from the first group of transmissions;
   if the signal strength of transmissions of the first communications protocol is above a threshold, then the transmission of the second communications protocol is prioritized the higher prioritized transmission and transmission of the first communications protocol is prioritized as the lower prioritized transmission;
   if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission; and
   if the signal strength of transmissions of the first communications protocol is below the threshold and if the transmission of the first communications protocol is one of the second group of transmissions, then the transmission of the second communications protocol is prioritized as the higher prioritized transmission and the transmission of the first communications protocol is prioritized as the lower prioritized transmission.

12. The method of communicating transmissions according to claim 11, wherein:
   the first communications protocol is Wi-Fi;
   the second communications protocol is Bluetooth; and
   the first group of transmissions of the first communications protocol includes one of an RTS frame, an CTS frame, an ACK frame, Block Ack frame, an ATIM frame, or a cf-ACK frame.

13. The method of communicating transmissions according to claim 9, wherein:
   the transmissions of the first communications protocol includes a first group of transmissions and a second group of transmissions different from the first group of transmissions;
   the transmissions of the second communications protocol includes a third group of transmissions and a fourth group of transmissions different from the third group of transmissions;
   if the signal strength of transmissions of the first communications protocol is above a threshold and if the transmission of the second communications protocol is one of the third group of transmissions, then the transmission of the second communications protocol is prioritized as the higher prioritized transmission and the transmission of the first communications protocol is prioritized as the lower prioritized transmission;
   if the signal strength of transmissions of the first communications protocol is above a threshold and if the transmission of the second communications protocol is one of the fourth group of transmissions, then the transmission of the first communications protocol is prioritized as the higher prioritized transmission and the transmission of the first communications protocol is prioritized as the lower prioritized transmission;
   if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission; and
   if the signal strength of transmissions of the first communications protocol is below the threshold and if the transmission of the first communications protocol is one of the second group of transmissions, then the transmission of the second communications protocol is prioritized as the higher prioritized transmission and the transmission of the first communications protocol is prioritized as the lower prioritized transmission.

14. The method of communicating transmissions according to claim 9, wherein:
   the transmissions of the first communications protocol includes a first group of transmissions and a second group of transmissions different from the first group of transmissions;
   the transmissions of the second communications protocol includes a third group of transmissions and a fourth group of transmissions different from the third group of transmissions;
   if the signal strength of transmissions of the first communications protocol is above a threshold and if the transmission of the second communications protocol is one of the third group of transmissions, then the transmission of the second communications protocol is prioritized as the higher prioritized transmission and the transmission of the first communications protocol is prioritized as the lower prioritized transmission;
   if the signal strength of transmissions of the first communications protocol is above a threshold and if the transmission of the second communications protocol is one of the fourth group of transmissions, then the transmission of the first communications protocol is prioritized as the higher prioritized transmission and the transmissions of the second communications protocol is prioritized as the lower prioritized transmission;
   if the signal strength of transmissions of the first communications protocol is below the threshold and if the transmission of the first communications protocol is one of the first group of transmissions, then the transmission of the first communications protocol is prioritized as the higher prioritized transmission and the transmission of the second communications protocol is prioritized as the lower prioritized transmission;
   if the signal strength of transmissions of the first communications protocol is below the threshold, if the transmission of the first communications protocol is one of the second group of transmissions, and if the transmission of the second communications protocol is one of the third group of transmissions, then the transmission of the second communications protocol is prioritized as the higher prioritized transmission and the transmission of the first communications protocol is prioritized as the lower prioritized transmission; and
   if the signal strength of transmissions of the first communications protocol is below the threshold, if the transmission of the first communications protocol is one of the second group of transmissions, and if the transmission of the second communications protocol is one of the fourth group of transmissions, then the transmission of the first communications protocol is prioritized as the higher prioritized transmission and the transmission of the second communications protocol is prioritized as the lower prioritized transmission.

15. The method of communicating transmissions according to claim 9, wherein:
the first communications protocol is Wi-Fi; and
the second communications protocol is Bluetooth.

16. The method of communicating transmissions according to claim 9, wherein, during the step of communicating, after the higher prioritized transmission in communicated, the lower prioritized transmission is communicated.

\* \* \* \* \*